US008899661B2

(12) United States Patent
Knox et al.

(10) Patent No.: US 8,899,661 B2
(45) Date of Patent: Dec. 2, 2014

(54) DECK PANEL FOR CARGO CARRYING VEHICLE

(75) Inventors: Howard T. Knox, Independence, KY (US); Paul W. Baker, Cambridge, OH (US)

(73) Assignee: Ancra International LLC, Azusa, CA (US)

( * ) Notice: Subject to any disclaimer, the term of this patent is extended or adjusted under 35 U.S.C. 154(b) by 152 days.

(21) Appl. No.: 13/245,307

(22) Filed: Sep. 26, 2011

(65) Prior Publication Data

US 2012/0256436 A1 Oct. 11, 2012

Related U.S. Application Data

(60) Provisional application No. 61/473,326, filed on Apr. 8, 2011.

(51) Int. Cl.
| | | |
|---|---|---|
| B65D 19/00 | (2006.01) | |
| B62D 33/02 | (2006.01) | |
| B60P 1/00 | (2006.01) | |

(52) U.S. Cl.
CPC .......................................... B60P 1/00 (2013.01)
USPC ..................................... 296/184.1; 296/24.44

(58) Field of Classification Search
USPC ................. 296/3, 24.44, 24.45, 182.1, 184.1; 248/235, 250; 108/44, 57.25, 53.3
See application file for complete search history.

(56) References Cited

U.S. PATENT DOCUMENTS

| | | | | |
|---|---|---|---|---|
| 3,433,184 A | * | 3/1969 | Addy ............................ | 108/53.3 |
| 4,013,020 A | * | 3/1977 | Schoeller et al. .......... | 108/57.16 |
| 5,408,937 A | * | 4/1995 | Knight et al. ................ | 108/55.5 |
| 5,813,355 A | * | 9/1998 | Brown et al. ................ | 108/53.3 |
| 6,910,668 B2 | | 6/2005 | Henning | |
| 7,188,817 B2 | * | 3/2007 | Henning ................... | 248/346.02 |
| 7,293,813 B2 | * | 11/2007 | Squyres et al. ............ | 296/24.44 |
| 8,172,494 B1 | * | 5/2012 | Knox ............................. | 410/89 |
| 8,230,793 B2 | * | 7/2012 | Apps ............................ | 108/53.3 |
| 2007/0181045 A1 | * | 8/2007 | Smyers ........................ | 108/53.3 |
| 2008/0308015 A1 | * | 12/2008 | Apps ............................ | 108/53.3 |
| 2009/0050030 A1 | * | 2/2009 | Apps et al. ................... | 108/53.3 |
| 2010/0043676 A1 | * | 2/2010 | Apps et al. ................... | 108/53.3 |
| 2010/0147198 A1 | * | 6/2010 | Palmer ........................ | 108/53.3 |
| 2010/0236455 A1 | * | 9/2010 | Apps ............................ | 108/53.3 |
| 2011/0139040 A1 | * | 6/2011 | Apps et al. ................... | 108/53.3 |
| 2012/0048154 A1 | * | 3/2012 | Toomer et al. .............. | 108/53.3 |
| 2012/0240828 A1 | * | 9/2012 | Apps et al. ................... | 108/53.3 |

(Continued)

FOREIGN PATENT DOCUMENTS

JP          06191536 A  *  7/1994  .................. 108/53.3

*Primary Examiner* — Gregory Blankenship
(74) *Attorney, Agent, or Firm* — Brinks Gilson & Lione

(57) ABSTRACT

The combination of a cargo carrying vehicle and a deck panel. The cargo carrying vehicle has a storage space and a plurality of parallel elongate load beams in the space. A lower surface of the deck panel engages each of the first and second elongate load beams. The body has a plurality of discrete components depending from the lower surface that are abuttable to the load beams to thereby limit shifting of the deck panel. The upper surface has at least a first opening and the lower surface has at least a first complementary projection. A second deck panel, the same as the first deck panel, can be stacked on the first deck panel so that a corresponding at least first projection on the second deck panel extends into the at least first opening to maintain the first and second deck panels in a predetermined stacked relationship.

11 Claims, 8 Drawing Sheets

(56) References Cited

U.S. PATENT DOCUMENTS

2012/0256436 A1* 10/2012 Knox et al. ............... 296/3
2012/0291677 A1* 11/2012 Lin ......................... 108/53.3
2013/0032507 A1* 2/2013 Du Toit et al. ............ 206/599

* cited by examiner

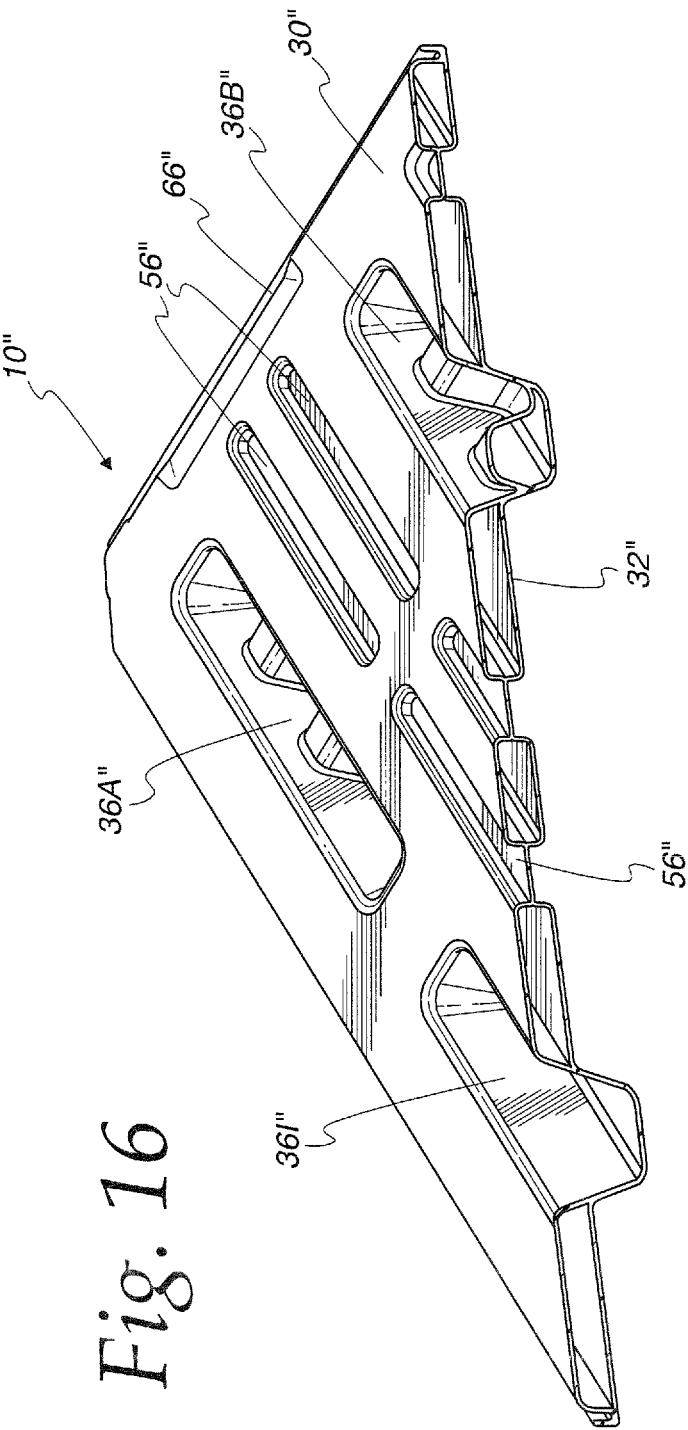

DECK PANEL FOR CARGO CARRYING VEHICLE

BACKGROUND OF THE INVENTION

1. Field of the Invention

This invention relates to deck panels that span, and are supported upon, adjacent load beams above a floor on a cargo carrying vehicle.

2. Background Art

Load beams are commonly used in cargo carrying vehicles to define a support for cargo above a main, upwardly facing floor surface. Exemplary load beams are shown in U.S. Pat. No. 7,578,644. The load beams span the width of the storage space and have ends that are releasably connected, one each, to spaced side walls that bound the storage volume. The beams are placed at controlled fore-and-aft intervals to provide stable support for spanning deck panels upon which cargo is placed.

Designers of these panels focus on a number of different criteria. First and foremost, the panels must have the ability to stably support cargo and so that it is maintained in place without significant shifting occurring relative to the underlying beams with an associated vehicle in motion.

Heretofore, many of the deck panels have been made from plywood. While plywood panels are functionally adequate, the use of plywood has a number of drawbacks.

Plywood that has a thickness adequate to support heavy loads is generally quite heavy, particularly when stored outside where it is prone to absorbing moisture through rain, snow, etc. Those responsible for loading vehicles must maneuver sheets that are typically on the order of four foot square. Aside from the weight, each panel, by reason of its large footprint, is difficult to handle, particularly for a single individual who must somehow effect a grasp on the edges thereof while maneuvering the panel to elevate it, transport it, and place the same strategically upon the load beams.

The flat surfaces of plywood are also relatively smooth. As a result, the lower surfaces on the installed plywood panels have a tendency to shift relative to underlying beams. At the same time, cargo tends to shift along the upper surfaces of the panels. Thus, appropriate provision must be made to confine both shifting of the panels themselves and the loads thereon.

Plywood panels are also difficult to maneuver individually from a stacked relationship. That is, while the plywood panels stack compactly in a face-to-face relationship, it may be difficult to grasp the individual panels to separate them from the stack.

Plywood panels are also prone to degradation, particularly after repeated use. Plywood that is not adequately dried tends to buckle. Plywood also has a tendency to splinter, which not only affects its integrity but also creates weakened areas and loose splinters that may interfere with comfortable handling by a user. Separated wood fragments may have to be collected regularly in the storage space and from adjacent loading areas. Plywood may also weaken or fail after repeated bending under load.

Generally, since plywood is made with laminated layers, a progressive compromising of the individual layers may lead to weakening or failure.

Still further, plywood is inconvenient to dispose of in an ecologically appropriate manner once it has reached the end of its useful life. Commonly, the spent plywood panels will simply be stacked in a manner whereby, in significant accumulation, they become obtrusive and unsightly.

It is known to make panels from an injection moldable plastic material to address certain of the above problems. An example of such a panel is shown in U.S. Pat. No. 6,910,668.

Many of the above problems are still contended with using panels injection molded from plastic, and the like. Molding in a contour that keys the panels against shifting relative to underlying beams stabilizes the panel mounting. However, this keying structure interferes with compact stacking of the panels where they are staged or stored.

Further, conventionally used injection molding materials create a low friction surface on the top of the panels. Thus, loads tend to shift easily against such surfaces and steps must be taken to positively secure cargo thereon.

Conventional configurations of these injection molded panels typically make them less than convenient to handle, particularly for a single individual. That is, handling involves much the same technique as handling the plywood panels, discussed above. For a single individual, this is not a convenient process.

While injection molded panels generally may have a longer anticipated useful life than those made from plywood in most applications, eventually the panels will be worn or replaced, which necessitates disposal of the old panels. Commonly, materials used to injection mold the panels are not biodegradable. Thus, disposal of large volumes of molded panels has a detrimental environmental impact.

The injection molding processes used in the past have commonly been carried out utilizing a polymer that flows readily in a heated state. These polymers tend to be brittle at low temperatures. The panels made with these polymers have thus been prone to fracturing and breakage when utilized in cold environments. Once compromised, these panels must be discarded to avoid a potentially dangerous failure in use. Early failure of these panels also has a significant economic impact that makes them impractical in certain environments and for certain heavy loading.

Another problem with prior art panels, made either from plywood or molded material, is that they are generally not stackable in a manner that facilitates bulk transportation, as around a yard using a forklift, or the like. Since plywood stacks face-to-face, there is no practical way to introduce the leading ends on the forks on a lift between panels without inflicting damage thereupon. While molded panels have raised elements that produce spacing between adjacent stacked panels, the inability of the panels to consistently nest in a predetermined manner results in their being unstably stacked. Attempts to introduce forks between adjacent panels may cause upper panels to fall off of the lifted stack.

In spite of the fact that the transportation industry utilizes very large numbers of these panels, the industry has contended with the above problems because there have been no viable commercial designs that are capable of effectively meeting the many design criteria. The industry continues to seek out panel designs that have a long useful life and are maneuverable, light in weight, stable in operation, and environmentally friendly.

SUMMARY OF THE INVENTION

In one form, the invention is directed to the combination of a cargo carrying vehicle and first deck panel. The cargo carrying vehicle has a storage space bounded by a floor surface and peripheral wall surface and a plurality of elongate load beams, including first and second elongate load beams, with lengths that extend in substantially parallel relationship. The first deck panel is operatively engaged with the first and second load beams and has a body with oppositely facing upper and lower surfaces. The lower surface engages each of the first and second elongate load beams. The body has a plurality of discrete components depending from the lower surface that are abuttable to at least one of the first and second elongate load beams to thereby limit shifting of the operatively engaged first deck panel transversely to the lengths of the first and second elongate load beams. The upper surface has at least a first opening and the lower surface has at least a first projection. The at least first opening and at least first projection have shapes that are complementary such that a second deck panel, the same as the first deck panel, can be stacked on the first deck panel so that a corresponding at least first projection depending from a lower surface on the second deck panel extends into the at least first opening to maintain the first and second deck panels in a predetermined stacked relationship.

In one form, the deck panel is made using a thermoforming process.

In one form, at least one of the plurality of discrete components defines the at least first projection.

In one form, the at least first projection is hollow to define the at least first opening.

In one form, the body is substantially square and has a central through opening bounded by an edge to receive a hand of a user. The user's hand is extendable into the central opening to allow the edge to be grasped.

In one form, the body has a perimeter edge and there is a ramp surface on the perimeter edge to guide a fork on a fork lift to between stacked deck panels.

In one form, the body is made from separate sheets using a thermoforming process.

In one form, the separate sheets are made from materials that have one of: a) different durability; and b) different frictional properties.

In one form, the body is made from a recyclable material.

In one form, the body has integrally molded indicia thereon that is at least one of: a) identification of a manufacturer; b) identification of an owner; c) date of manufacture; d) a location for UPC labelling; and e) an orienting guide.

In one form, the elongate load beams in the plurality of elongate load beams have the same configuration. The first deck panel has a width. The plurality of discrete components is arranged so that with the first deck panel operatively engaged at least one of: a) each of three of the elongate load beams engages the bottom surface of the first deck panel and at least one of the three elongate load beams abuts to one of the discrete components with the three elongate load beams spaced from each other at equal intervals along the width of the first deck panel; and b) each of four of the elongate load beams engages the bottom surface of the first deck panel and a plurality of the four elongate load beams abuts to one of the discrete components with the four elongate beams spaced from each other at equal intervals along the width of the first deck panel.

In one form, each of the at least one discrete component and at least first opening has an L shape.

In one form, the separate sheets are fused to define a plurality of elongate reinforcing ribs.

In one form, there is a hollow space between the separate sheets.

In one form, the discrete components are configured so that the first deck panel can be operatively engaged with the first and second load beams with the first deck panel in first and second different positions relative to the first and second load beams. The second position for the first deck panel is turned through 90° around a vertical axis from the first position for the deck panel.

In one form, the deck panel is made using a thermoforming process from separate sheets and the separate sheets are fused to define a plurality of elongate reinforcing ribs each with a length. The lengths of a first plurality of the elongate reinforcing ribs are oriented transversely to the lengths of a second plurality of the elongate reinforcing ribs.

In one form, at least one reinforcing component is embedded in the thermoformed material.

In one form, the materials are selected so that the upper surface of the deck panel is made from a higher frictional material than the material defining the lower surface of the deck panel.

In one form, the first deck panel has a perimeter edge and a discrete projection around the peripheral edge.

In one form, the perimeter edge and lower surface meet at a corner, and the corner is radiused to be convex.

BRIEF DESCRIPTION OF THE DRAWINGS

FIG. 12b is an enlarged view of the portion of the deck panel within the circle in FIG. 12a;

FIG. 16 is an enlarged, perspective view of a removed piece of the deck panel in FIGS. 11-15 at one of the corners thereon.

DETAILED DESCRIPTION OF THE PREFERRED EMBODIMENT

Figure 1:
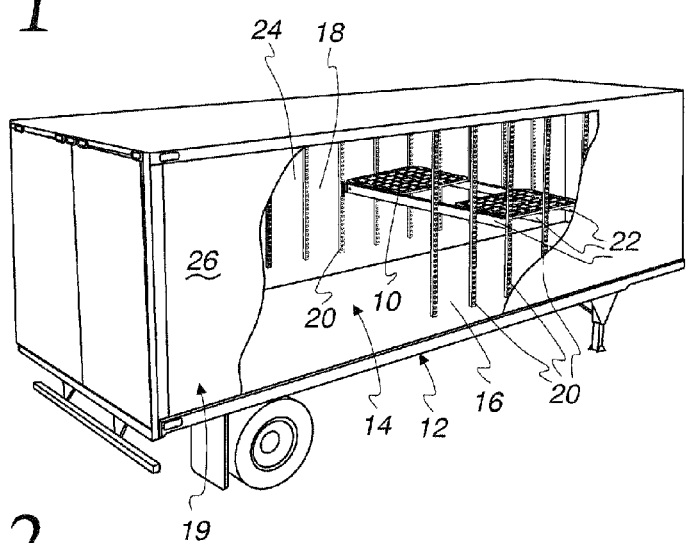
FIG. 1 is a fragmentary, perspective view of a cargo carrying vehicle with a deck panel, according to the present invention, operatively engaged with load beams within a storage space.
Figure 2:
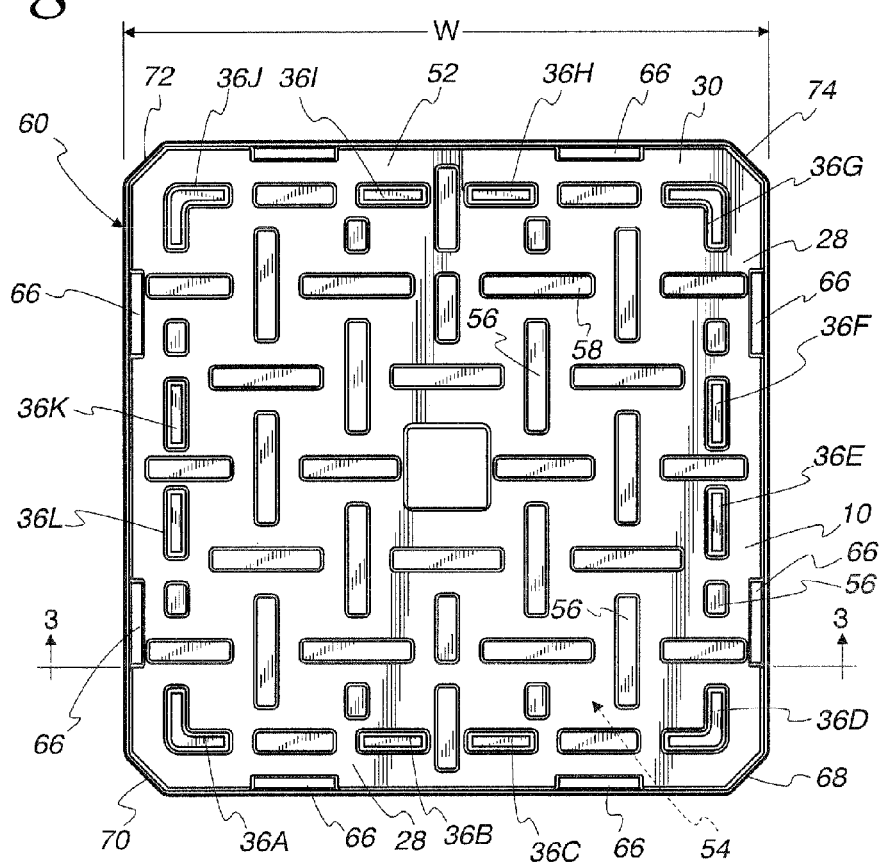
FIG. 2 is a top view of the inventive deck panel.

As seen in FIG. 1, the invention is directed to a deck panel 10 that is used in a cargo carrying vehicle 12 having a storage space 14 for cargo. The storage space 14 is bounded by a floor surface 16 and a surface 18 on a peripheral, upstanding wall 19. The peripheral wall surface 18 is reinforced by vertically extending posts 20.

Elongate load beams 22 span between spaced side walls 24, 26, making up a part of the wall 19, and are releasably connected to the reinforcing posts 20 thereon at a desired height. The load beams 22 are oriented with their lengths horizontal and in a substantially parallel relationship.

The deck panel 10 is shown in FIG. 1 operatively engaged with three spaced, underlying load beams 22 of like construction. The load beams 22 are spanned by the deck panel 10 and provide vertical support therefor. Typically, more than two load beams 22 will be spanned by, and engage, each deck panel 10, depending upon the weight and nature of the supporting cargo.

The deck panel 10, as shown in detail additionally in FIGS. 2-6, consists of a body 28 with oppositely facing upper and lower surfaces 30, 32, respectively. The surfaces 30, 32 are generally flat. A plurality of discrete components 34A-34L depends from the lower surface 32. The discrete components 34A-34L are strategically located to abut to at least one of the load beams 22 to thereby limit shifting of the operatively engaged deck panel 10 transversely to the length of the load beams 22, in a fore-and-aft direction with respect to the vehicle 12.

Figure 4:
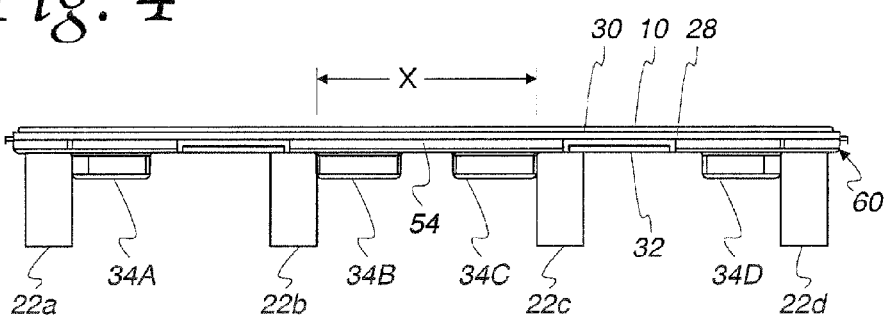
FIG. 4 is a view as in FIG. 3 with the deck panel operatively engaged with four load beams.
Figure 5:
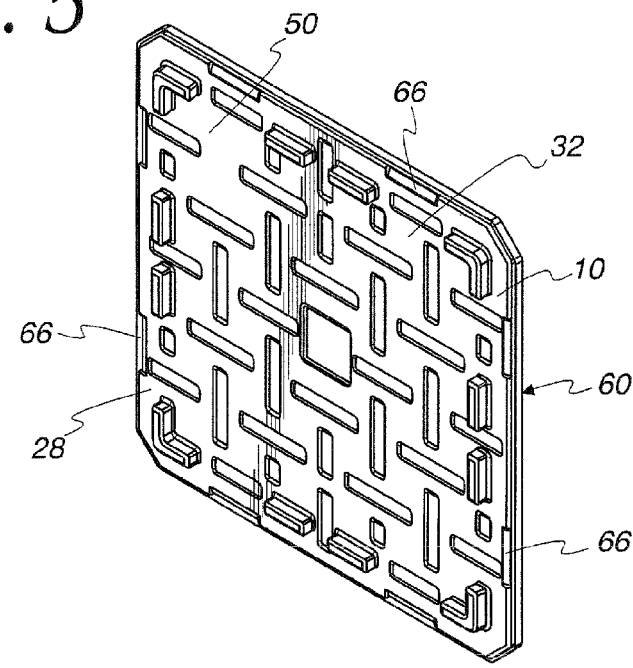
FIG. 5 is a reduced, bottom, perspective view of the deck panel in FIGS. 2-4.
Figure 6:
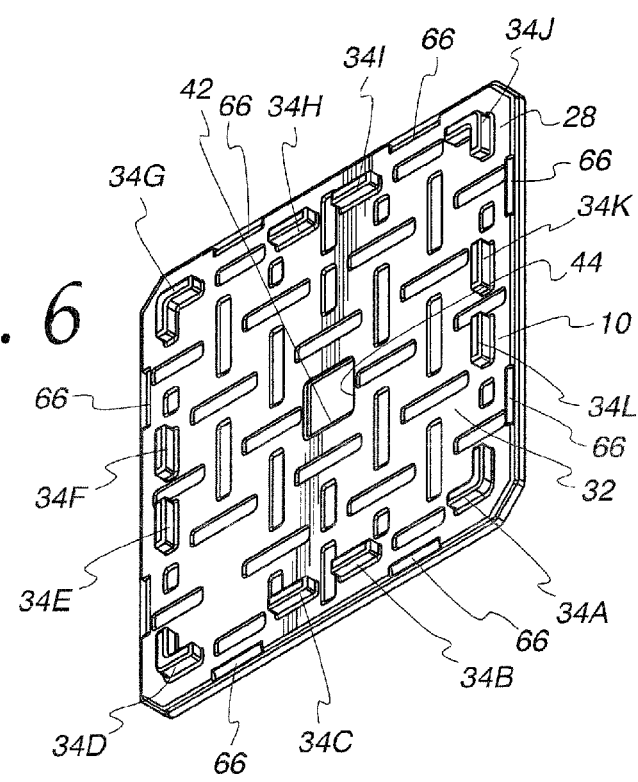
FIG. 6 is a view as in FIG. 5 from a different bottom perspective.

In FIG. 4, four load beams 22a, 22b, 22c, 22d are shown supporting the deck panel 10. The load beams 22a-22d are spaced from each other at regular intervals along the width W of the deck panel 10. Facing sides of the load beams 22b, 22c are spaced a distance X to thereby abut and straddle the component pair 34B, 34C and 34H, 34I. The load beam 22d abuts to the components 34D, 34E, 34F, 34G, with the load beam 22a abutting to the components 34A, 34J, 34K, 34L. Through this arrangement, the deck panel 10 is positively keyed against shifting relative to the load beams 22a, 22b, 22c, 22d, transversely to the length of the load beams 22a-22d, with the deck panel 10 operatively engaged with the load beams 22a-22d.

One, a plurality, or all of the components 34A-34L may be made hollow to define corresponding openings 36A-36L through the upper surface 30. The components 34A-34L define projections with shapes such that with identical deck panels 10, stacked one upon the other, the components/projections 34A-34L on the overlying deck panel 10 extend into the openings 36A-36L, that are complementary in shape, to thereby maintain the panels 10 keyed in a predetermined stacked relationship that is compact to a degree determined by the amount of penetration by the components/projections 34A-34L. The interaction may occur between any one or more of the components/projections 34A-34L and openings 36A-36L.

In the depicted embodiment, the corner discrete components 34A, 34D, 34G, 34J and cooperating openings 36A, 36D, 36G, 36J have complementary L shapes for additional body rigidity and positive interlocking of stacked panels 10.

Figure 7:
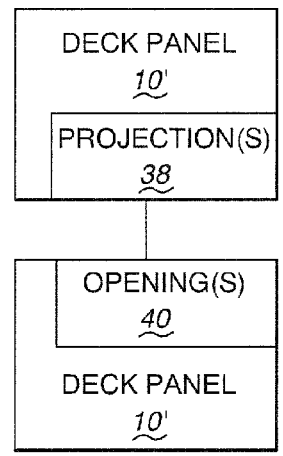
FIG. 7 is a schematic representation of a modified form of deck panel with interacting projections and openings to facilitate stacking.

Alternatively, as shown in FIG. 7, deck panels 10' can be made with one or more cooperating projections 38 and openings 40 that facilitate keyed stacking without requiring that the projections 38 interact with the load beams 22. That is, the projections 38 and openings 40 can be dedicated stacking components without any other function.

Figure 8:
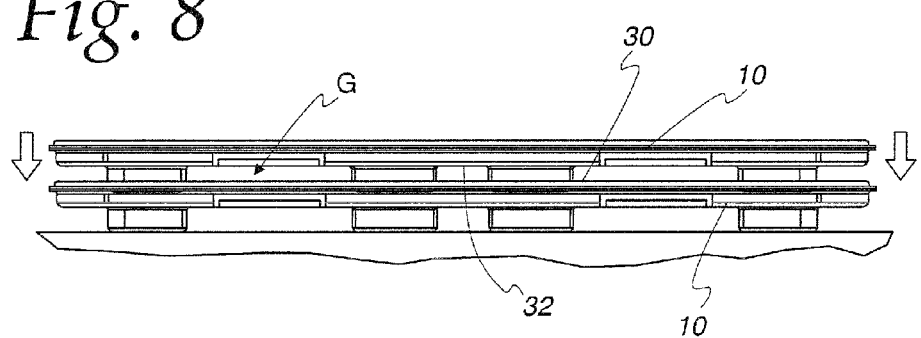
FIG. 8 is a side elevation view showing an overlying deck panel being moved into stacked relationship with an underlying deck panel.

In FIG. 8, an overlying deck panel 10 is shown being directed downwardly into stacked relationship with an underlying deck panel 10 with each of the discrete components 34A-34L on the underlying deck panel 10 being hollow to define openings 36A-36L for each of the discrete components/projections 34A-34L of the overlying deck panel 10.

The discrete components 34A-34L and openings 36A-36L are tapered so that each discrete components 34A-34L will be guided progressively into its respective opening 36A-36L. This shape and tapering can be selected to control depth of penetration of the discrete components 34A-34L to thereby maintain a gap G between upper and lower surfaces 30, 32 of facing and adjacent under- and over-lying stacked panels 10, respectively. The desirability of this gap G is explained below.

The depicted panel 10 is shown with a square shape with approximately a four foot by four foot exemplary dimension. To facilitate grasping and carrying, the body 28 of the deck panel 10 has a central through opening 42 bounded by an edge 44. The opening 42 is dimensioned to allow passage therethrough of a user's hand in a manner to allow the edge 44 to be grasped by the user's hand to hold and maneuver the deck panel 10. A six inch square opening is adequate for this purpose.

Figure 9:
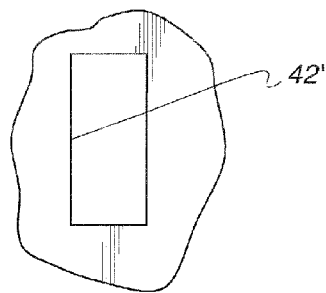
FIG. 9 is an enlarged, fragmentary view of a portion of a deck panel with a gripping opening formed therethrough that is different than the gripping opening on the deck panel in FIGS. 2-6.

A modified opening 42' is shown in FIG. 9 with a rectangular shape.

In one preferred form, the body 28 of the deck panel 10 is made using a thermoforming process. Two or more sheets 50, 52 may be formed using molds and combined by fusion through a conventional thermoforming process. This facilitates molding of the required contours into the separate top and bottom sheets. Typically, the sheets are made from high-density polyethylene (HDPE), or the like. The body 28 may be made from fully recyclable material.

The separate thermoformed sheets 50, 52 may be made from materials that have one of: a) different durability; and b) different frictional characteristics to exploit these properties.

With the two sheets 50, 52 combined, a hollow space 54 is defined therebetween. The sheets 50, 52 are strategically fused by forming discrete portions of the sheets 50, 52 against each other to define elongate reinforcing ribs 56, 58, with the lengths of the ribs 56, 58 orthogonal to each other. The transverse arrangement of the lengths of the ribs 56, 58 affords greater multidirectional reinforcement. The ribs 56 have different lengths, as do the ribs 58, which lengths are selected based upon the desired rigidity and location of the rigidified ribs 56, 58.

Additionally, the configuration of the deck panel 10 is such that it can be operatively engaged with the load beams 22 with the deck panel 10 in at least first and second different positions relative to the load beams. The second position for the deck panel 10 is turned through 90° around a vertical axis from the first position for the deck panel 10. With this arrangement, the deck panel 10 can be operatively engaged with the load beams 22 without requiring any specific alignment. That is, the deck panel 10 can be operatively engaged in any of four different positions relative to the underlying load beams 22. The transverse arrangement of the ribs 56, 58 assures that regardless of how the deck panel 10 is operatively engaged, the lengths of a plurality of the ribs 56, 58 will align transversely, and preferably orthogonally, to the lengths of the load beams 22 to adequately rigidify the deck panel 10 under the load beams 22.

Figure 3:
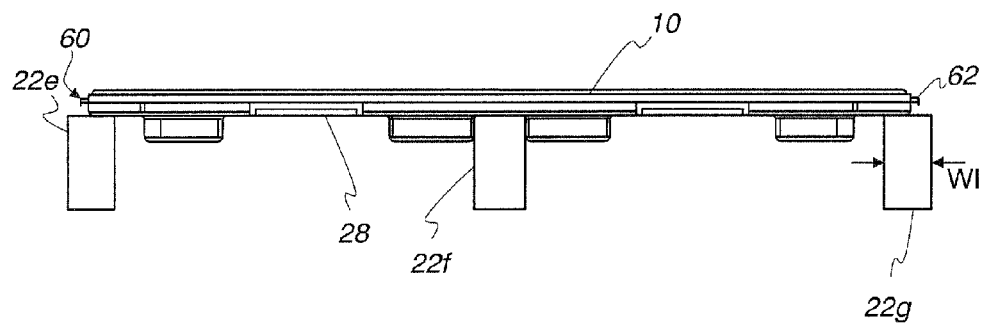
FIG. 3 is a cross-sectional view of the deck panel taken along line 3-3 of FIG. 2 and showing three load beams with which the deck panel is operatively engaged.

The depicted configuration for the deck panel 10 also affords versatility in allowing selective use of four load beams 22a, 22b, 22c, 22d, as shown in FIG. 4 at regular spacing intervals, or three load beams 22e, 22f, 22g, at regular intervals, as shown in FIG. 3, or potentially with non-regular intervals. In FIG. 3, the load beam 22f resides between, and abuts, the discrete component pairs 34K, 34L and 34E, 34F to thereby positively key the deck panel 10 to the load beam 22f to prevent shifting of the deck panel 10 transversely to the length of the load beam 22f. The load beams 22e, 22g underlie the perimeter edge 60 of the deck panel 10.

Typically, the deck panel 10 will have a square shape with a 48-inch width dimension. In FIG. 4, the load beams 22a-22d are spaced on 16-inch centers, with the load beams 22e-22g on 24-inch centers. Typically, the load beam 22 will have a width W1, shown for exemplary load beam 22g, that is approximately 3½ inches.

On the perimeter edge 60, a discrete projection 62 is formed fully therearound. This projection 62 deforms under impact to absorb forces that might otherwise damage the main portion of the panel 10 within the perimeter edge 60.

As noted above, the sheets 50, 52 may be made with different properties. As one example, the sheet 50 defining the upper surface 30 may be made from a higher friction material than that of the sheet 52 defining the lower surface 32. The upper surface 30 must resist excessive shifting of cargo placed thereupon.

Figure 10:
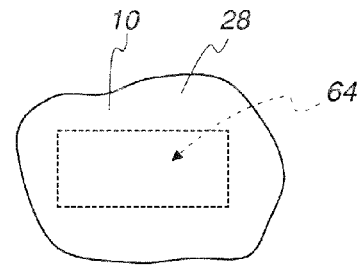
FIG. 10 is an enlarged, fragmentary view of a portion of a deck panel with informational indicia thereon.
Figure 11:
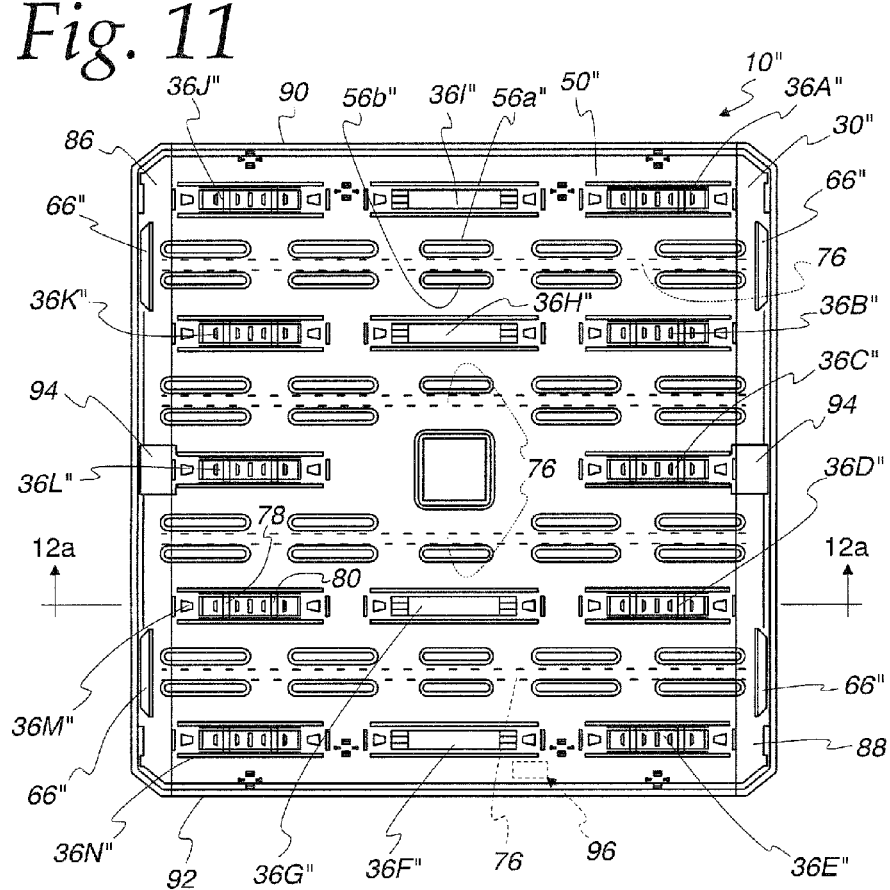
FIG. 11 is a top view of a modified form of deck panel, according to the present invention.

As shown in FIG. 10, indicia, as shown generically at 64, may be thermoformed into the body 28. The indicia 64 may be at least one of: a) identification of a manufacturer; b) identification of an owner; c) date of manufacture; d) a location for UPC labeling; and e) an orienting guide. Alternatively, contrasting colored strips, or other detectable indicia 64, may be integrally thermoformed or otherwise applied to assist proper orientation of the deck panels 10 during installation.

To assist engagement of the stacked deck panels 10, as by a forklift, a series of ramp surfaces 66 is provided in pairs at the perimeter edge 60 of the body 28. These ramp surfaces 66 guide forks on a forklift to between adjacent stacked deck panels 10 that is facilitated also by the maintenance of the gap G, as seen in FIG. 8.

The corners 68, 70, 72, 74 of the body 28 are angled to eliminate sharp corners that might be encountered by a user as he/she engages and transports the deck panel 10 and to provide clearance in radiused corners of a typical freight trailer.

In FIGS. 11-16, a modified form of deck panel, according to the present invention, is shown at 10".

While the deck panel 10" may be made symmetrical, as the deck panel 10, to allow the same to be operatively positioned in four different relationships with underlying load beams 22, the deck panel 10" is specifically shown to be oriented in one manner relative to the underlying and cooperating load beams 22. That is, the panel 10" can be operatively positioned in only two different positions, with the panel 10" turned around a vertical axis 180° between these two positions.

The basic structure of the deck panel 10", and its operation, correspond generally to the structure and operation of the deck panel 10. The deck panel 10" is similarly thermoformed with sheets 50", 52", respectively defining upper and lower surfaces 30", 32", respectively.

In this embodiment, the ribs 56" have lengths aligned in parallel relationship and substantially orthogonal to the lengths of load beams 22a, 22b, 22c, 22d with which the deck panel 10" is operatively engaged.

To add structural integrity, one or more reinforcing components 76 may be molded between the sheets 50", 52" to be captively embedded therebetween. The reinforcing components 76 may be in the form of rods or bars, that may be made from steel or other high strength material. In this embodiment, the reinforcing components 76 each resides between a series of paired reinforcing ribs 56" along its length, as shown for exemplary reinforcing ribs 56a", 56b" in FIG. 11.

The deck panel 10" has discrete components 34A"-34N" designed to cooperate, one each, with corresponding discrete openings 36A"-36N".

The discrete openings 36A"-36E" and 36J"-36N" have the same configuration. The exemplary discrete opening 36M" is mold formed with a wave-type pattern to produce raised steps 78, 80 that cooperatively bear against the bottom surface 82 of the discrete component 34M" that nests therein with like deck panels 10" stacked. The steps 78, 80 thus control the depth of penetration of the discrete component 34M", thereby to maintain a gap between stacked panels 10", corresponding to the gap G shown in the prior embodiment.

The discrete openings 36F"-36I" are not shown to have any structure corresponding to the steps 78, 80 therein, though such structure could be incorporated.

The deck panel 10" has a perimeter edge 60" that is modified from the perimeter edge 60 in the prior embodiment.

Figure 12A:
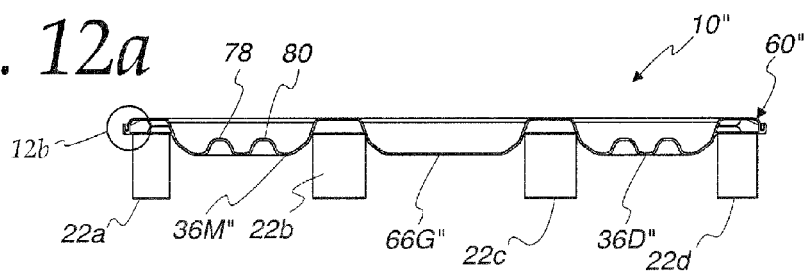
FIG. 12a is a cross-sectional view of the deck panel taken along line 12a-12a of FIG. 11.
Figure 12B:
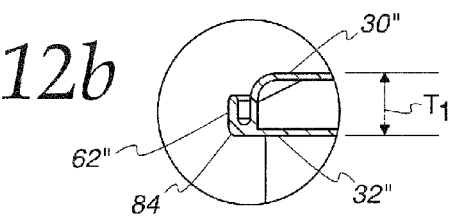
Figure 13:
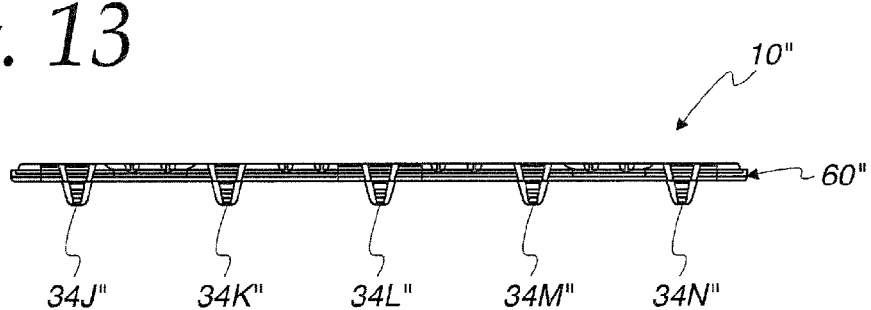
FIG. 13 is an end elevation view of the deck panel in FIG. 11.
Figure 14:
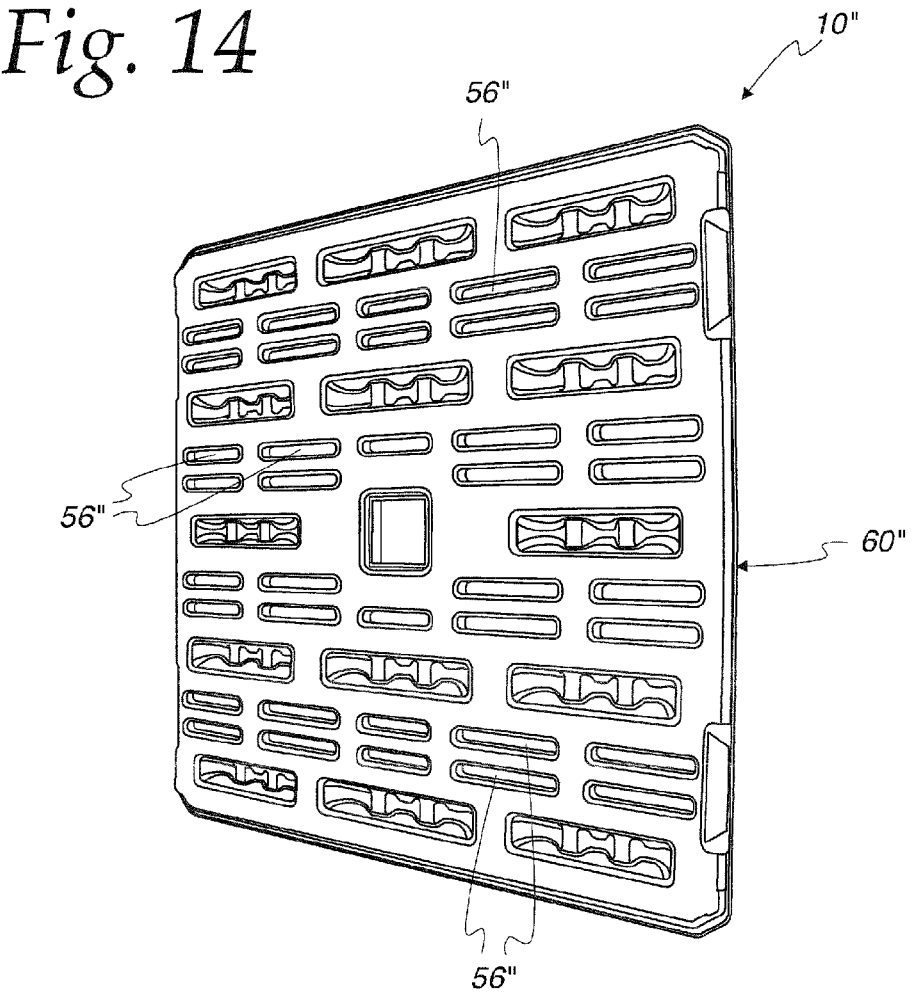
FIG. 14 is a top perspective view of the deck panel in FIGS. 11-13.
Figure 15:
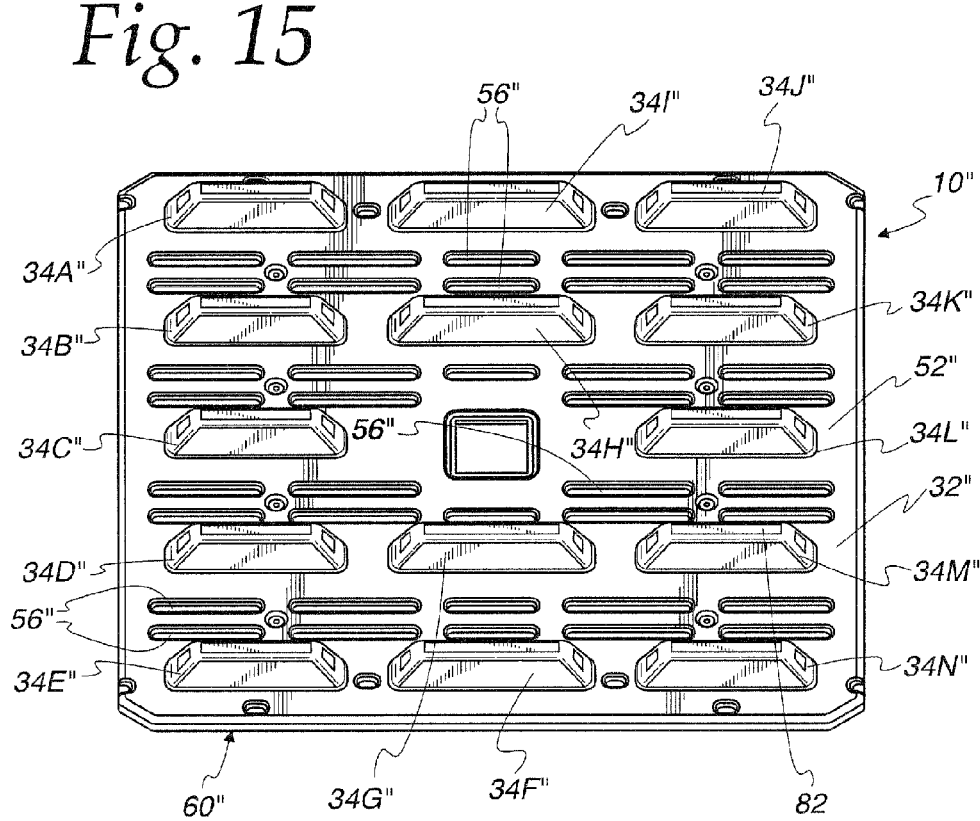
FIG. 15 is a bottom perspective view of the deck panel in FIGS. 11-14.

As seen particularly in FIG. 12, the perimeter edge 60" has a stepped configuration with the bottom "step" blending into a vertical projection 62". The step extends over slightly greater than one half the thickness T1 of the deck panel 10" between the upper and lower surfaces 30", 32", respectively.

The projection 62" and lower surface 32" meet at a corner 84 that is radiused to be convex.

The described step and discrete projection 62" can be made by a rolling step during the molding process. This rolled edge design has been found to improve impact resistance by reason of its ability to absorb impact forces and spring back without transmitting these potentially damaging forces to the panel region within the perimeter edge 60".

To facilitate installation of the deck panel 10", markings 86, 88 are provided in the form of contrasting stripes, extending the full dimension of the deck panel 10" between edge portions 90, 92. With this arrangement, the installer can easily align the lengths of the markings 86, 88 with the lengths of the underlying load beams 22a-22d.

Other structure might be used to identify the line of the underlying load beams 22, such as an arrow, texturing of the surface along the line, etc.

With the deck panels 10" operatively engaged with the load beams 22a-22d, the load beam 22b abuts to the paired discrete components 34F", 34N"; 34G", 34M"; 34H", 34K"; 34I", 34J", and against the discrete component 36L". The load beam 22a aligns to abut the discrete components 34J"-34N". The beams 22c, 22d cooperate in like fashion on the other side of the deck panel 10".

The same concepts can be used to operatively engage a three load beam arrangement with the load beams 22 at equal intervals.

The deck panel 10" has ramp surfaces 66" corresponding to the ramp surfaces 66 in the prior embodiment.

Between each of the ramp surfaces, flat surfaces 94 are thermoformed for conveniently applying indicia 64, as described above, that is readily observable, even with the deck panels 10" stacked. As in the prior embodiment, this indicia 64 may be any information such as information relating to manufacturer, date of manufacture, owner, a particular job, etc.

Other indicia may be thermoformed into the deck panel as shown at 96 on the upper surface 30", or elsewhere upon the deck panel 10".

The foregoing disclosure of specific embodiments is intended to be illustrative of the broad concepts comprehended by the invention.

The invention claimed is:

1. A deck panel for use in a cargo carrying vehicle, comprising:
   a body configured to rest upon a plurality of elongate load beams that are configured to be aligned in parallel in a storage space of a cargo carrying vehicle, the body comprising oppositely facing upper and lower surfaces,
   the lower surface comprising a plurality of discrete components depending therefrom and abuttable to at least one of the plurality of elongate load beams when the body rests thereupon, wherein engagement between the plurality of discrete components and the plurality of elongate load beams limits shifting of the body with respect to the load beams;

the upper surface having a plurality of openings and the lower surface having a plurality of projections wherein each one of the plurality of openings corresponds with one of the plurality of projections, each of the plurality of openings and each of the plurality of projections comprise shapes that are complementary such that a second deck panel, the same as the first deck panel, can be stacked on the first deck panel so that a corresponding at least first projection depending from a lower surface on the second deck panel extends into the at least first opening to maintain the first and second deck panels in a predetermined stacked relationship, wherein each of the plurality of openings comprises a bottom portion that comprises one or more raised steps extending vertically above a remainder of the bottom portion, such that the projection depending from the lower surface on the second deck panel engages a top surface of the one or more raised steps.

2. The deck panel according to claim 1 wherein the deck panel is made using a thermoforming process.

3. The deck panel according to claim 1 wherein the body is substantially square and has a central through opening bounded by an edge to receive a hand of a user, the user's hand extendable into the central opening to allow the edge to be grasped.

4. The deck panel according to claim 1 wherein the body further comprises an edge that extends around a perimeter of the body, wherein edge along at least one side of the body includes at least two spaced apart ramp surfaces that are include a planar surface discontinuous from the remainder of the edge along the at least one side of the body, wherein the at least two ramp surfaces are configured to guide a fork on a fork lift to between stacked deck panels.

5. The deck panel according to claim 2 wherein the body comprises separate sheets and is made using the thermoforming process, and further comprising at least one reinforcing component between the thermoformed separate sheets.

6. The deck panel according to claim 5 wherein both of the separate sheets have one of: a) different durability; and b) different frictional properties.

7. The deck panel according to claim 2 wherein the body is made from a recyclable material.

8. The deck panel according to claim 5 wherein the separate sheets are fused to define a plurality of elongate reinforcing ribs.

9. The deck panel according to claim 5 wherein there is a hollow space between the separate sheets.

10. The deck panel according to claim 1 wherein the first deck panel has a perimeter edge and a discrete projection around the peripheral edge.

11. The deck panel according to claim 1 wherein the first deck panel has a perimeter edge, the perimeter edge and lower surface meet at a corner and the corner is radiused to be convex.

* * * * *